Nov. 29, 1955  S. O. LEVINSON ET AL  2,725,482
IRRADIATING APPARATUS
Filed Oct. 21, 1952  2 Sheets-Sheet 2
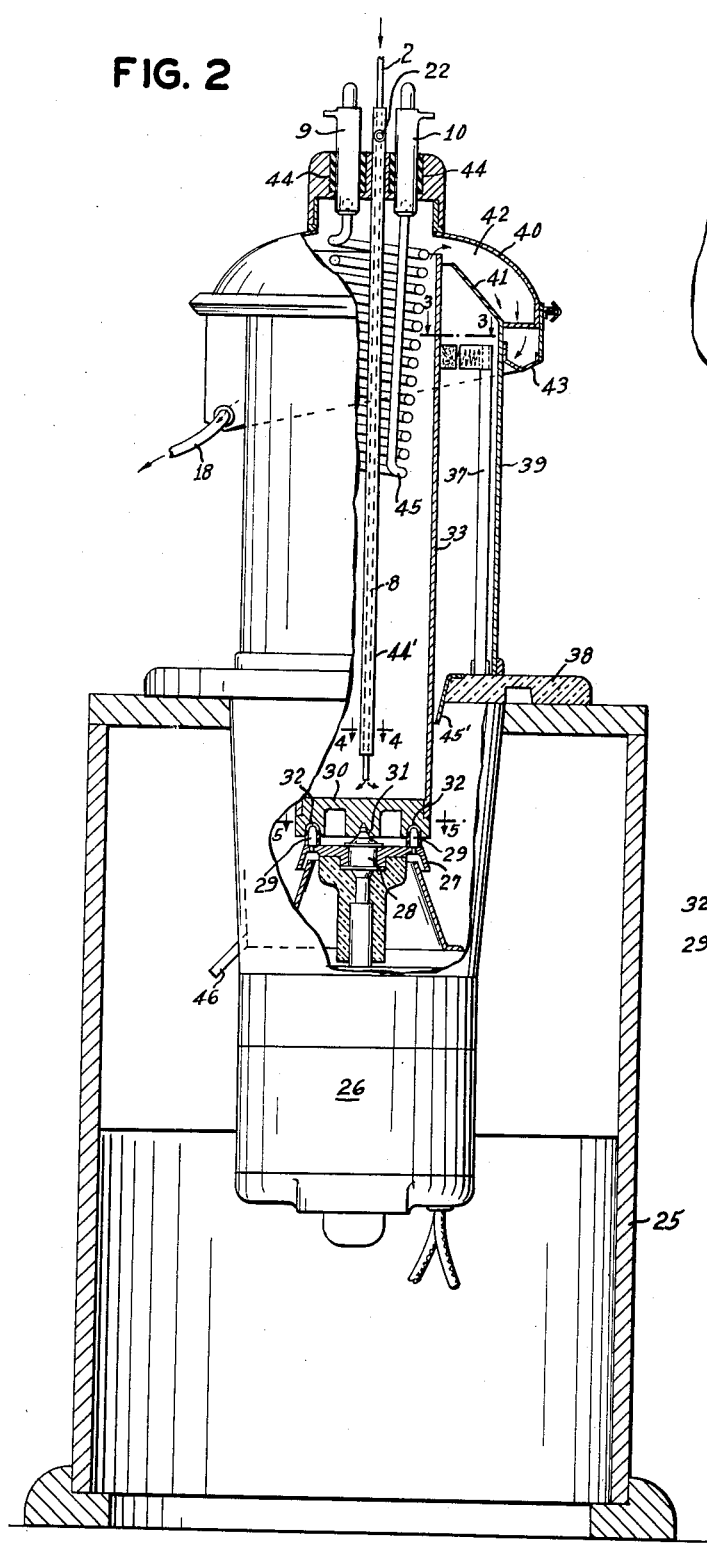
FIG. 2
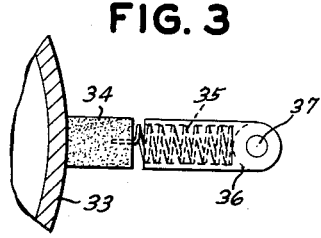
FIG. 3
FIG. 4
FIG. 5
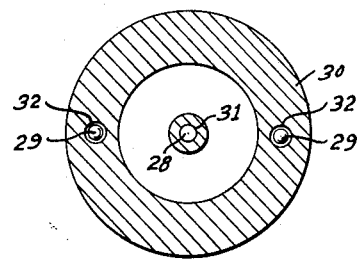
INVENTORS
Sidney O. Levinson
Franz Oppenheimer
BY
ATTORNEYS

United States Patent Office 2,725,482
Patented Nov. 29, 1955

2,725,482

IRRADIATING APPARATUS

Sidney O. Levinson and Franz Oppenheimer, Chicago, Ill., assignors to Michael Reese Research Foundation, Chicago, Ill., a nonprofit corporation of Illinois Application October 21, 1952, Serial No. 315,958

7 Claims. (Cl. 250—49)

This invention relates to a novel method and apparatus for the sterilization of contaminated fluids containing delicate organic compounds without materially impairing their biologic activity and potency. It is especially useful in the sterilization of liquids with a high absorption co-efficient for ultraviolet light.

A novel and distinct advantage of this invention is its ability to provide means to expose liquids of high viscosity to bactericidal ultraviolet irradiation in a flowing very thin film. The apparatus described in detail below affords means to create a flowing liquid film of reproducible uniformity as thin as one micron and it is feasible to expose such thin films to the irradiation of germicidal energy for periods from $1/100$ of a second to 10 seconds.

In our United States Patents Nos. 2,421,381, granted June 3, 1947, and 2,452,201, granted October 26, 1948, we describe methods of treating contaminated solutions and suspensions containing delicate and sensitive organic components without materially impairing their chemical properties. These methods have proved to be practical and useful and are today widely practiced in biologic laboratories. By the method of Patent No. 2,421,381 vaccines have been produced for the medical profession of higher potency than has heretofore been possible. The method of Patent No. 2,452,201 has been very valuable in the sterilization of important medical preparations which could otherwise not be sterilized without appreciable loss of their biologic activity.

Patent No. 2,452,201 also discloses one type of apparatus which may be used for the practice of our inventions. In this apparatus the liquid passes through an irradiation cell made of ultraviolet permeable material where the thickness of the fluid to be sterilized is definitely established and the exposure time controlled. A definite amount of lethal ultraviolet energy penetrates through the cell and sterilization can be obtained without materially impairing the potency of the biologic material. We have been able to build cells of a depth as thin as $1/10$ of a millimeter. It is feasible to make cells with even smaller spacings in a manner such as described in our prior United States Patent No. 2,476,152, granted July 12, 1949. However, if spacings less than $1/10$ of a millimeter are used, it becomes difficult to force the liquid through the cell. The pressure necessary to establish a desired flow varies disproportionately with the spacing and if the spacing is less than $1/10$ of a millimeter, this pressure will become excessive and impractical.

If the fluid to be sterilized has a low absorption coefficient for ultraviolet light, relatively thick films (several millimeters thick) can be sterilized by bactericidal ultraviolet light. To illustrate, if the absorption co-efficient of the liquid is 10, a 200 micron film of this liquid absorbs only 18.1 percent of the incident ultraviolet energy, and if we compare the energy absorbed by the 10 micron layer closest to the ultraviolet light source to that absorbed by the 10 micron layer furthest away from the light source, the amounts absorbed are 1 percent compared to 0.8 percent. However, if the absorption coefficient is higher, the amount of ultraviolet light absorbed by the first 10 micron layer compared to the amount absorbed by the last 10 micron layer becomes very much higher. To cite an example; if the absorption coefficient of the fluid to be sterilized is 100, the relative amounts absorbed by the first 10 micron layer of a 200 micron film and by the last 10 micron film is 9.5 percent and 1.5 percent. This means that the first layer absorbs six times the energy that the last 10 micron layer absorbs. If 1.5 percent of the total energy is that required to produce sterilization or inactivation, the amount absorbed by the first layer will be excessive and might cause chemical changes and loss of biologic activity and potency. There are many sensitive fluids where the absorption coefficient is higher than 100 and it has heretofore been impossible to sterilize these liquids without undesirable chemical and biological changes. As pointed out above, if the absorption coefficient is very high, the discrepancy of absorption within the film is even more pronounced. Many of these liquids are of value to the health of the nation. To cite an example: whole broken eggs and their components, yolk and egg white, which may contain pathogenic organisms, cannot be sterilized with ultraviolet irradiation by the presently known methods. The method and apparatus constituting our invention makes it feasible to sterilize such substances by creating uniform films so thin that they can be penetrated sufficiently by ultraviolet light and where the amount absorbed in the first layer varies little compared to the amount absorbed in the last layer.

The apparatus forming a part of this invention, produces flowing, uniform liquid films as thin as one micron. According to our experimental evidence the exposure time necessary to sterilize contaminated liquid decreases disproportionately with the thinning out of liquid films and denaturization of delicate compounds is lessened at a similar ratio. By employing such thin films, and thereby decreasing the time factor, a relatively small machine can handle many liters per hour because exposure time necessary for sterilization is reduced to a minimum. The dimensions of this apparatus can, however, easily be enlarged to handle large amounts of fluids economically and commercially.

In practicing the invention, we utilize centrifugal force to create this thin film and move it upwards against gravity. The details of the use of centrifugal force will be explained in the description of the apparatus. The principle part of this machine is a conical bowl which may be closed at its lower end and which rotates around its axis. The fluid is delivered to the bottom of the bowl where centrifugal force spreads it out and forces it up the sides of the bowl. The ultraviolet light source is located inside of the bowl and the radiation falls upon the inner surface of the conical cup. The thickness of the film traveling upwards in the bowl is determined by the following factors:

1. The rate of flow of the liquid into the bottom of the bowl.
2. The numerical value of the centrifugal force which is produced by the speed of rotation and the physical dimensions of the bowl.
3. The conical angle of the bowl.
4. Viscosity of the liquid.
5. Friction factor of fluid against the bowl as created by surface and material of the bowl.

The flow rate of the liquid appears to increase or decrease the film thickness in direct proportion to the flow.

The centrifugal force to which the liquid is subjected, which must be considerably greater than gravity, controls not only the film thickness but also the exposure time of the liquid to the irradiation. The rate at which the liquid is fed to the apparatus and the conical angles of the bowl also affect these values. The film, in all instances, must be thin enough that the centrifugal forces acting on it and on the bowl are substantially the same.

Variation in the conical angle of the bowl, affects the exposure time and, to a lesser extent, the film thickness. Other factors being the same, the smaller the enclosed angle, the longer the exposure time. Higher viscosities of the treated fluids increase the thickness of the film. An advantage of the invention is that high viscosity fluids can be formed in sufficiently thin films to permit sterilization of them, either by increasing the speed of rotation, or employing a larger bowl. The bowl is preferably made of stainless steel and the inner surface highly polished to reduce friction.

For the most successful operation, the bowl should be machined within the narrowest margin so as to be absolutely round and straight. The bowl should be smooth and should not have pockets because some of the liquid could be trapped there for a considerable length of time. Differences in roundness would mean disuniform centrifugal force and a variation from straight would represent a deviation of the desired conical angle. We prefer to use a conical bowl with an enclosed angle from 10 minutes to 10 degrees. It is of importance that the conical bowl and its driving mechanism are delicately balanced and the bowl should rotate on its true center. Vibration of the apparatus may break the film into droplets, and if the bowl should rotate off center, the film might be thicker on one side of the bowl than on the other. If these conditions are closely adhered to, the film of liquid in the bowl is of uniform and reproducible thickness. This film thickness in the bowl varies slightly from bottom to top and this variation becomes larger if the conical angle is increased with a simultaneous increase of speed of rotation which means higher centrifugal forces. The film thickness of the liquid in the bowl and its slight decrease on upward travel can be exactly calculated. We have checked these calculations by measuring the time of travel of the liquid in the bowl with lights and photocells, and there is good agreement. Any given particle in the film does not travel upwards in a straight line but follows a spiral path, and there may be shearing forces acting upon the film. However, at the film thicknesses which we prefer to use, 1 to 50 microns, the speed of travel of any particle inside the film can be considered to be the same.

The rotating bowl imparts centrifugal force to the fluid film and if the film is thin enough in the above stated range, the centrifugal force of film and bowl are substantially alike. The conical angle accelerates the upward rise of the liquid and the enlarged surface area of the conical cup contributes to thinning out of the film. If the film is thin, the centrifugal force of all fluid particles can be considered alike, but if the film is thicker, the centrifugal force decreases with the distance of liquid particles from the bowl surface and there are marked differences in the speed of upward movement of liquid particles. This is undesirable. If the film is further thickened by increasing the rate of flow of the liquid or by slower rotation of the bowl (to give a figure, larger that 100 microns) back sliding may occur. The centrifugal force transmitted to the fluid from the metal bowl will be less than 1 g. We prefer to utilize in the apparatus centrifugal forces from 2 to 20 g's, but it is feasible to operate in a wider range of centrifugal forces. The conical bowl may be rotated by an electric motor through a direct drive with floating bearings hung in such a manner that the bowl during rotation will find its own true center. It is important that the electrical drive and the bowl are correctly and dynamically balanced to avoid vibration. The bowl may be driven by a belt and fixed bearings.

The flow rate of the liquid should be absolutely uniform and constant, and we obtain this by utilizing a metering gear pump and a constant reading flow-meter. The liquid will spread out on the flat bottom of the cup and ascend the sides of the bowl in a thin film. In order to be sure that the liquid will form this film the inner surface of the bowl must be absolutely clean and free of fat and other foreign matter. Before starting, we preferably should degrease the bowl with hot perchlorethylene after thorough cleansing with a detergent and a rinse with distilled water. As an added precaution to be sure that a film will form, we prefer to start the machine with a flow of distilled water or saline at a very high rate of flow for a few minutes.

When the film reaches the top of the bowl, which preferably should have a knife edge, it escapes into a collecting trough. This trough is constructed in such a manner that the liquid is decelerated slowly to avoid foaming and damage to delicate compounds or components of the fluid to be sterilized. Inside of the bowl is the ultraviolet light source which may be a straight lamp or a U type lamp or a conical spiral of the low pressure mercury glowing discharge type. We prefer to use the type of lamp as described in our United States Patent No. 2,528,969, granted November 7, 1950. This lamp, besides being capable of producing the resonance irradiation in large amounts, can be regulated as to ultraviolet output which is an added advantage. Commercial types of lamps for the emission of bactericidal ultraviolet may be used in multiple or single. We prefer to build this machine in such a manner that during operation it presents a closed system and can be filled with nitrogen. The nitrogen atmosphere will avoid undesirable ionization or ozone formation which will occur in air under the influence of ultraviolet light.

In the accompanying drawings, we have shown an organization of apparatus elements particularly suitable for use in practicing the process, and forming a part of the invention. In this showing:

Fig. 2 is a vertical, sectional view of the rotating bowl and associated elements;

Fig. 3 is a detailed, sectional view on line 3—3 of Fig. 2;

Fig. 4 is a similar view on line 4—4 of Fig. 2; and

Fig. 5 is a similar view on line 5—5 of Fig. 2.

Figure 1:
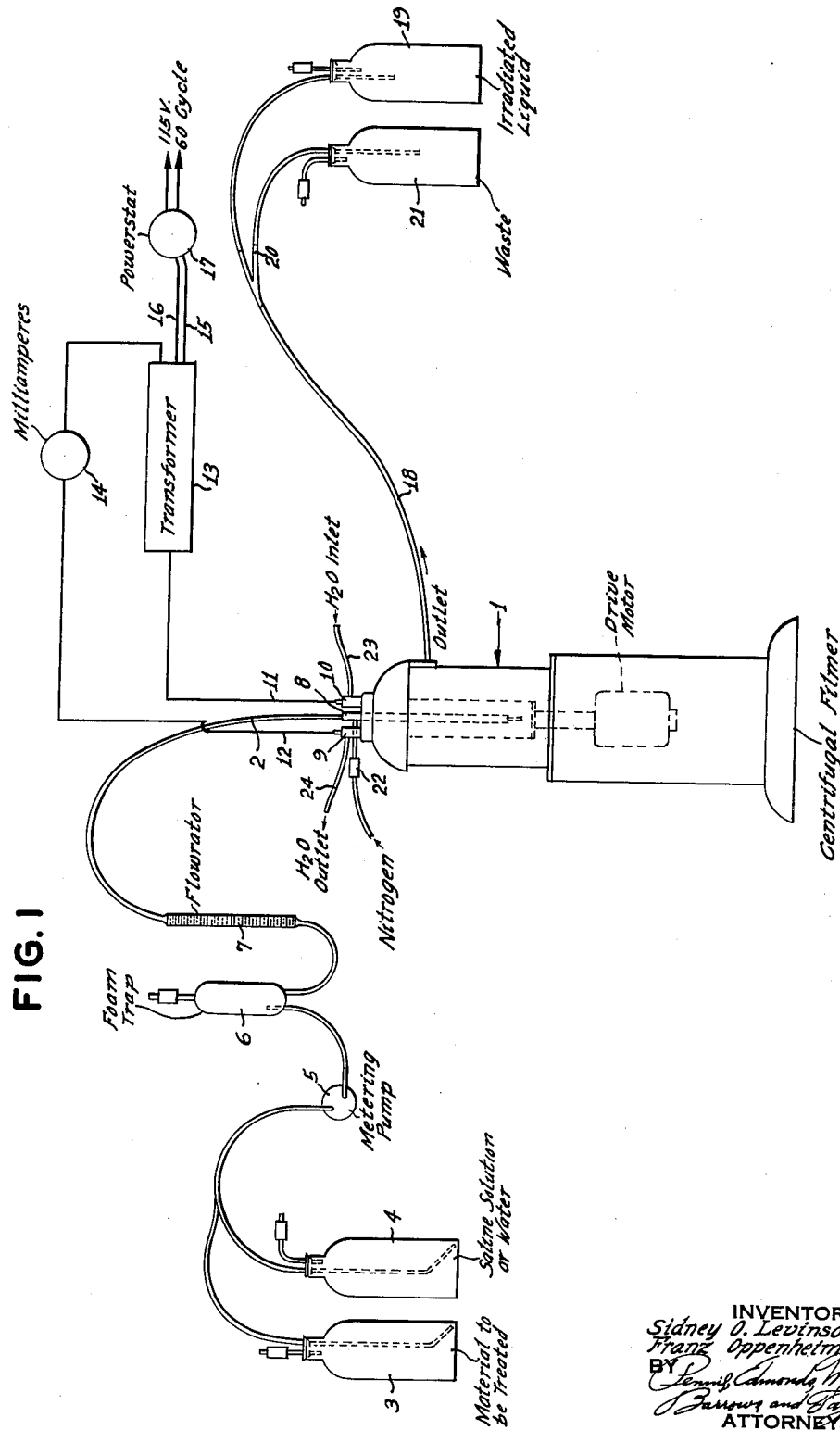
Fig. 1 is a diagrammatic view of the mechanism of the invention assembled with auxiliary apparatus used in practicing the process.

Referring first to the general lay-out of Fig. 1, the centrifugal filmer is designated generally by the reference numeral 1. This device and its functioning in the process will be described in detail in connection with Figs. 2 to 5 of the drawings. It is provided with a feed line 2 through which solutions or suspensions are delivered to the interior. Tracing the feed line from its other end, it is connected to a flask 3 containing the material to be treated, and it may be connected by a Y-connection to a flask 4 containing a saline solution or water used in preparing the apparatus for use. Material is drawn from one of the flasks by a metering-pump 5. It preferably passes through a foam trap 6 and then passes through flowrator 7. As pointed out, to secure a film of a desired thickness, all other factors being determined, it is necessary to maintain a given rate of flow of the solution or suspension being treated.

The feed line 2 connects to a tube 8 at the top of the filmer. Electrodes 9 and 10 of a mercury vapor lamp are also arranged at the top of the filmer. These electrodes are connected by lead lines 11 and 12 to transformer 13, an ampere meter 14 being arranged in the circuit, if desired. The transformer is connected to a source of current by leads 15 and 16 and a powerstat 17 may be arranged in advance of the transformer. The outlet of the filmer, which will be described in detail in connection with Figs. 2 to 5, is connected, preferably by a flexible tube 18, to a flask 19 in which the treated solution or suspension is collected. A Y-connection 20 may lead to a second flask 21 for the collection of water or saline solution used in cleaning the filmer. The top of the filmer may also be provided with a connection 22 for the introduction of nitrogen. A flexible tube 23 delivers cooling water to the electrodes of the lamp, and it is exhausted through a similar tube 24.

Figs. 2 to 5 illustrate, in detail, the construction of the centrifugal filmer by which reproducible, uniform, thin films are obtained, and reference will be had to those figures for a further description of the invention. The apparatus rests upon a stand 25 which should be absolutely level for the proper functioning of the filmer. A motor 26, mounted in the stand, drives the filmer. In actual use we have employed a synchronous 115 volt, 60 cycle motor rotating at a speed of 1725 R. P. M. The motor should be dynamically balanced to secure the best results. A turntable 27 is directly connected to the drive shaft of the motor. The turntable has a central hemispherical projection 28 and two concentric drive pins 29. A plate 30 forms the bottom of the rotating bowl. It has a conical opening 31 for the reception of the projection 28, and openings 32 for the reception of the drive pins (see Fig. 5).

Supported on the bottom plate 30 is a frusto-conical bowl 33. It is preferably formed of stainless steel, and the enclosed angle of the particular bowl illustrated is 2°. As heretofore set forth, this angle may be widely varied. The bowl is engaged near the top by guide rings or brushes. As shown (see Fig. 3) the rings 34 are supported by spring 35 carried in brackets 36, and may be damped by a filling of oil. The brackets 36 are mounted on posts or rods 37 extending upwardly from the top 38 of the stand 25. The top of the bowl is open. It is surrounded by a cylinder 39 which makes the machine a closed system. A cover 40 is mounted on cylinder 39. The cover has an inner, spaced wall 41 forming a passage 42 into which the treated liquid flows from the top of the bowl. The material collects in a trough 43 and is delivered to outlet tube 18. The cover also carries plugs 44 which receive the electrodes 9 and 10 of the mercury vapor lamp. Lamp 45 is illustrated as a conical, spiral lamp arranged in the upper part of the bowl. As stated, it is preferably of the type disclosed in our United States Patent No. 2,528,969. The conical, spiral construction is not essential to the process of this application.

Tube 8, to which the fluid to be treated is fed by flexible tube 2, extends to a point near the bottom of the bowl. It is surrounded by a tube 44'. Nitrogen line 22 is connected to tube 44' to fill the apparatus with nitrogen. A metal ring 45' extends from the top of the stand to the bowl to close it from the motor end. An overflow 46 is provided to prevent damage to the motor in case of accidental flooding of the machine.

In operation, liquid to be treated is delivered to the machine through feed tube 2 to the tube 8 at a predetermined constant rate. All factors, including the angle of wall 33 of the bowl, the speed of rotation, the viscosity of the liquid and the rate of feed influence the thickness of the film. With the desired thickness of film determined, one or more of these factors may be adjusted to attain it. In practical operation, variation of rate of flow is most easily accomplished and is usually utilized to increase or decrease the thickness of the film. As stated, we can produce films as thin as one micron, but in actual operation, we have sterilized a wide variety of solutions and suspensions employing films from 1 to 50 microns thick. At these film thicknesses the particles travel up the wall of the bowl in a spiral path and flow into passage 42, whence they are collected in the trough 43.

The extremely thin films which the process is capable of producing permits the treatment of materials that heretofore have not been treated by ultra-violet radiation. It also permits materials which have heretofore been treated to be treated in thinner films in much shorter periods of time, thereby greatly reducing the possibility of affecting the biological or antigenic properties of the solution or suspension being treated.

We claim:
1. The herein described process of treating solutions or suspensions with irradiation which comprises delivering the liquid to the bottom of a rotating frusto-conical bowl having an included angle between 10 minutes and 10 degrees at such a rate that, correlated with the speed of rotation of the bowl, the solution or suspension will travel upwardly on the inner wall of the bowl in a film of substantially uniform thickness not greater than 100 microns, and submitting the film to irradiation during its upward passage.

2. The process of treating solutions or suspensions with irradiation which comprises delivering the liquid to the bottom of a frusto-conical bowl having an included angle of not more than 10°, rotating the bowl by drive means mounted in floating bearings whereby the bowl will find its own true center and avoid vibration, the rate of feed of the liquid and the rate of rotation of the bowl being so correlated that the solution or suspension will travel upwardly on the inner wall of the bowl in a film of substantially uniform thickness, and submitting the film to irradiation during its upward passage.

3. In a process of irradiating biologically active liquids, the method which comprises delivering the liquid at a controlled rate into the bottom of a rotating frusto-conical bowl having an included angle not greater than 10 degrees, correlating the feed and rate of rotation of the bowl to cause the liquid to travel upwardly on the inner surface of the bowl in a substantially uniform thin film, and submitting the film to ultraviolet irradiation.

4. The process of claim 1 in which the thickness of the film is not greater than 50 microns.

5. The process of claim 3 in which the thickness of the film is not greater than 50 microns.

6. Apparatus of the character described comprising a vertically disposed, frusto-conical bowl the wall of the bowl having an included angle of not more than 10 degrees, means for feeding liquid to the bottom of the bowl, means for rotating the bowl to cause the liquid to travel upwardly on the inner wall of the bowl in a thin film of substantially uniform thickness by centrifugal force, and a source of ultraviolet rays in the bowl.

7. Apparatus of the character described comprising a vertically disposed, frusto-conical bowl the wall of the bowl having an included angle of not more than 10°, means for feeding liquid to the bottom of the bowl, a dynamically balanced motor arranged beneath the bowl, a driving connection between the motor and the bowl to rotate the bowl without vibration and cause the liquid to travel upwardly on the inner wall of the bowl in a thin film of substantially uniform thickness by centrifugal force, and a source of ultraviolet rays in the bowl.

References Cited in the file of this patent

UNITED STATES PATENTS

| | | |
|---|---|---|
| 1,118,006 | Henri et al. | Nov. 24, 1914 |
| 2,072,417 | Berndt | Mar. 2, 1937 |